No. 622,044.　　　　　　　　　　　　　　　Patented Mar. 28, 1899.
J. R. HEATH.
CYCLE OR OTHER ROAD VEHICLE.
(Application filed Jan. 19, 1897.)
(No Model.)　　　　　　　　　　　　　　　3 Sheets—Sheet 3.
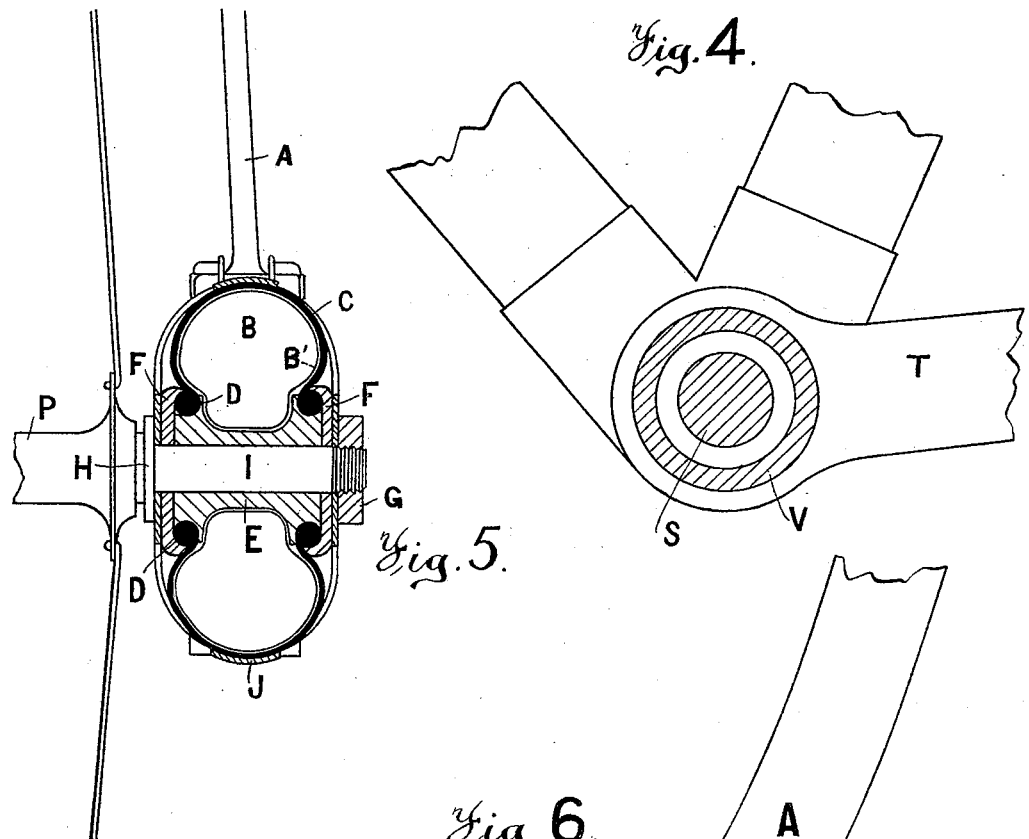
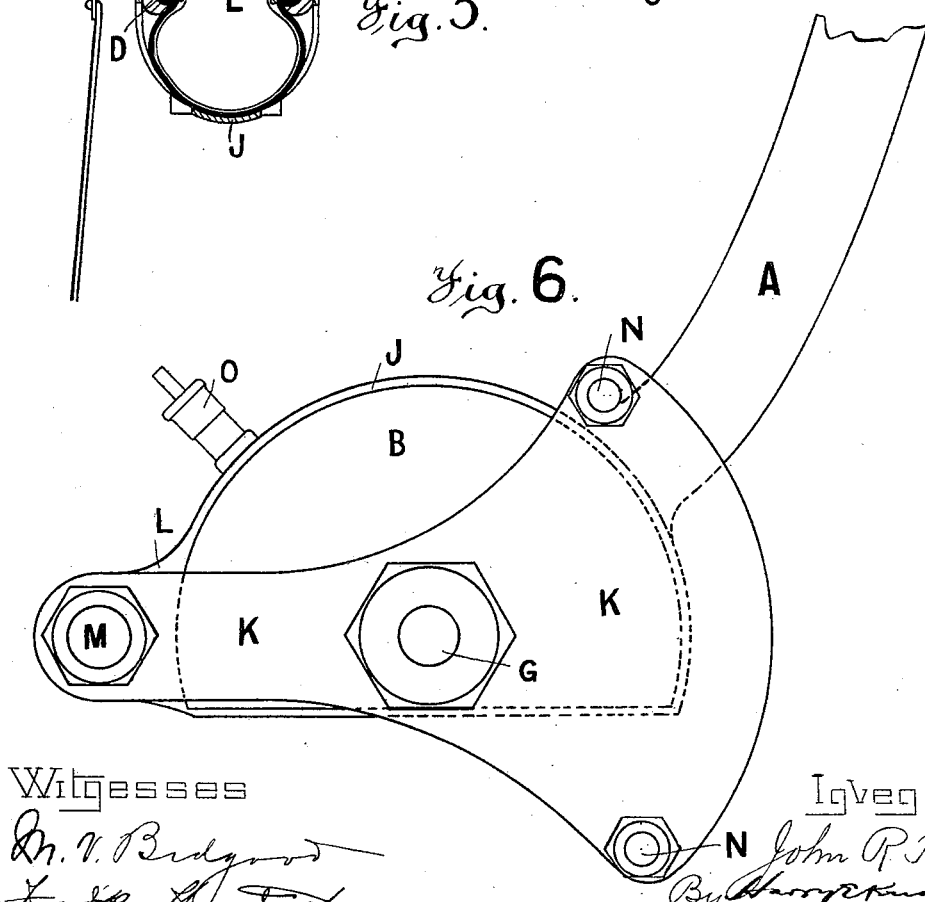
Witnesses　　　　　　　　　　　　　　　Inventor
M. V. Bridgwood　　　　　　　　　　　John R. Heath
Fred R. Hendrick　　　　　　　　By Harry P. Knight
　　　　　　　　　　　　　　　　　　　　atty
THE NORRIS PETERS CO., PHOTO-LITHO., WASHINGTON, D. C.

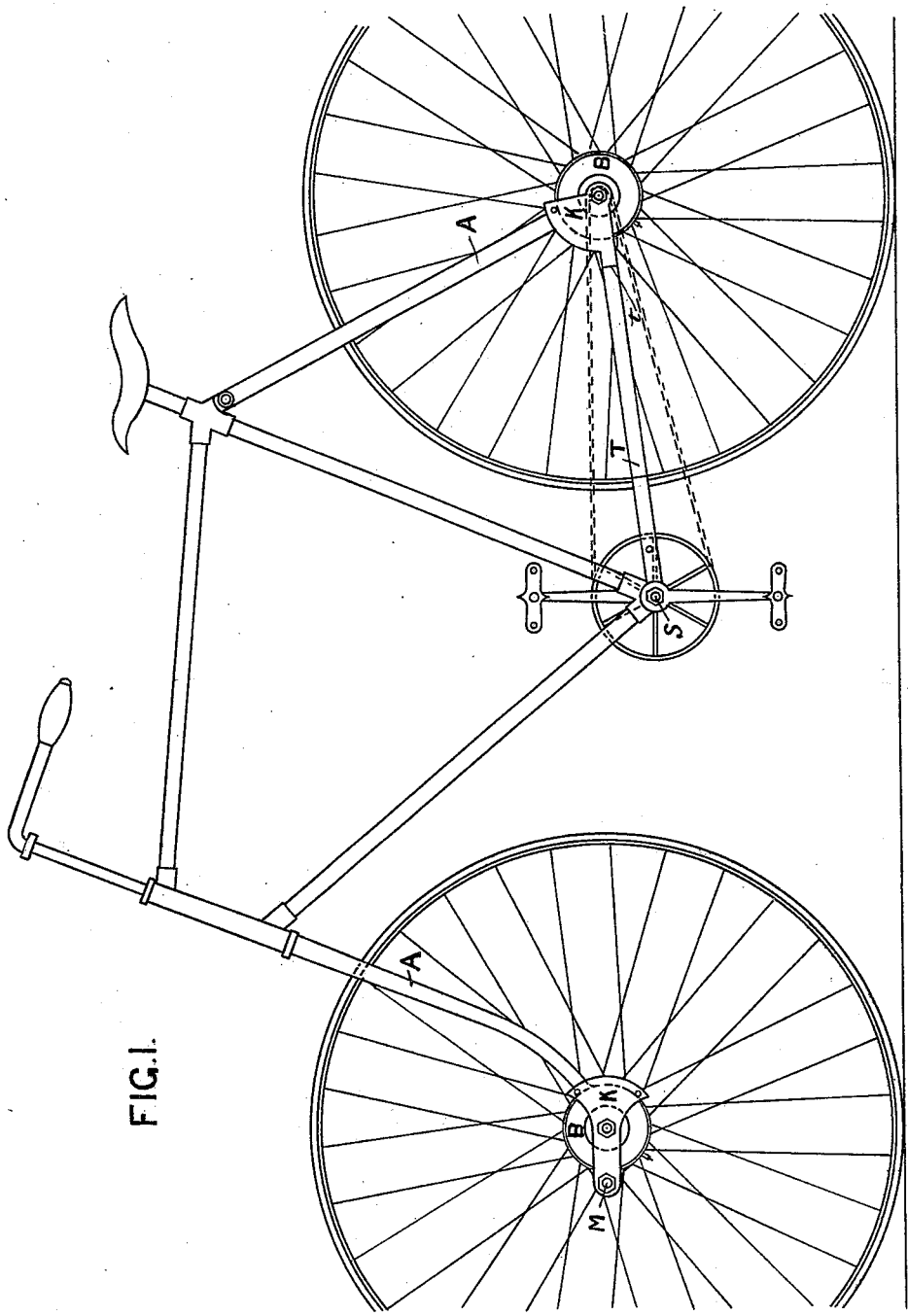

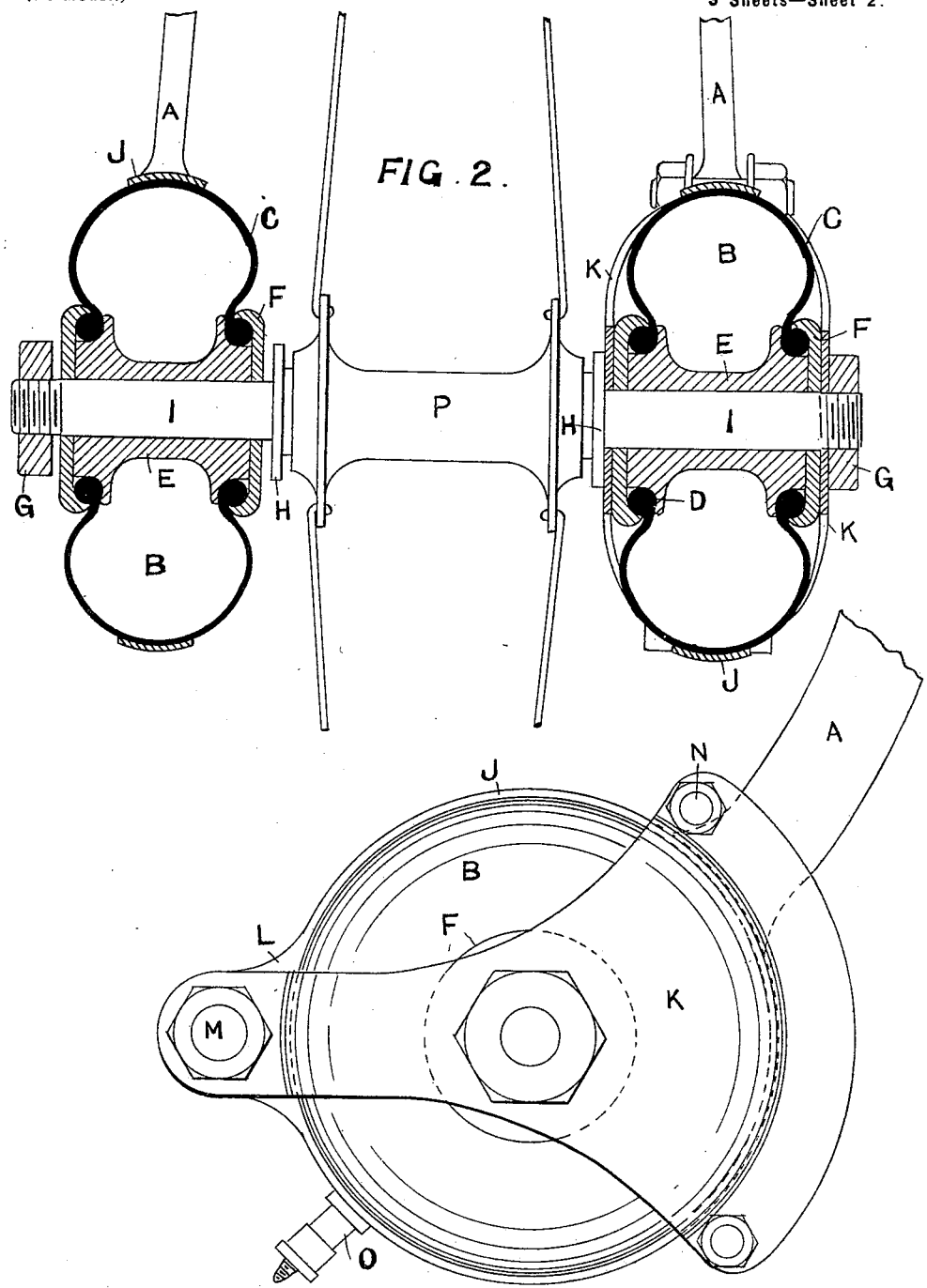

UNITED STATES PATENT OFFICE.

JOHN RICHARD HEATH, OF STOKE-UPON-TRENT, ENGLAND.

CYCLE OR OTHER ROAD-VEHICLE.

SPECIFICATION forming part of Letters Patent No. 622,044, dated March 28, 1899.

Application filed January 19, 1897. Serial No. 619,722. (No model.)

*To all whom it may concern:*

Be it known that I, JOHN RICHARD HEATH, a subject of the Queen of Great Britain, residing at Etruria, Stoke-upon-Trent, in the county of Stafford, England, have invented certain new and useful Improvements in Cycles or other Road-Vehicles, of which the following is a specification.

This invention has for its object the forming of a cycle or other road-vehicle in such manner that a pneumatic or other cushion or buffer between the frame or other support and the axle of the vehicle shall in great measure absorb shocks and vibration resulting from the movement of the vehicle on the road.

The invention consists, essentially, in placing a pneumatic annular buffer between the bearing or axle and the framework in conjunction with swinging guides to resist lateral displacement of the parts.

The invention is best described by aid of the accompanying drawings, illustrative of a bicycle made on this principle.

In the drawings, Figure 1 is a side view of the bicycle itself; Fig. 2, a vertical section of the center of the wheel and fork in which, on the left-hand side, plates K are omitted; Fig. 3, a side view of part of the fork and the bearing, showing the pneumatic device. Fig. 4 is a detailed section of the end and pivot of the thrust-rod. Fig. 5 shows in axial section a modified form of cushion, and Fig. 6 is a detail side view showing the link connection for guiding and supporting the cushioned bearing.

In the drawings, A is the fork; B, the annular cushion, formed of a ring C, of rubber and canvas or other suitable material, having annular thickened edges D, which fit in between a groove in the sleeve or bearing E and the annular incurved edge of the two side plates or washers F.

G is a nut screwing the mechanism up tight against the head H by means of a thread on the axle I.

J is an annular plate or rim attached to the fork A, and K is a side link or plate on each side of the bearing and pneumatic tube B.

L is a lug on the annular rim J, constructed to form a bearing for the bolt M, which forms a pivot for the side plates K to work on; N N, two small bolts also holding the side plates K together.

O is the ordinary inflating device.

The annular rim J is integral or rigid with the fork A, and the two side plates K, pivoted thereon at M, as shown in Fig. 6, form a swing-support, which serves to support and guide the axle and maintain it in parallelism to the pivot M, so that the wheel is allowed to move up and down with respect to the frame, but is not allowed to tip or twist to one side. By this means the wheel, while having a certain freedom of vertical movement, is made to run true in a vertical plane.

The mode of action is as follows: The fork, with its annular rim J, and the wheel P, with its axle I, being placed in position, as shown on the left-hand side of Fig. 2, but with the inner plate K previously placed in position, the annular cushion is placed in position, as shown, and the outer plate K placed also in position and the nuts M, N, and G screwed up. The pneumatic cushion B is then inflated through the device O in the usual manner. When an upward shock is given to the wheel, the elastic cushion B gives a little, and the upper nuts N of the side plates K rise a trifle above the fork A. The resiliency of the cushion, however, at once brings them back to their normal position, the side plate K oscillating on the pivot M.

In applying the invention to the axle of the driving-wheel the backstay A is attached to an annular rim J same as front wheel; but the side links or plates K are secured to the thrust-rod T at *t* instead of having a pivot at M L, as shown on front wheel, the other end of the thrust-rod T being pivoted to the bottom bracket of the frame, the pivot being concentric with the driving-axle S, as shown in Fig. 4, whereby vibration is absorbed by the cushion B instead of being transferred to the framework and whereby, also, the center of the driving-wheel axle is maintained at a constant distance from the treadle action, any variation in this distance being fatal to the proper working of the chain. In this case the thrust-rod T forms the swinging support that resists lateral displacement of the parts.

In some cases I may have an inner tube inside the pneumatic ring C, so that in case the latter be punctured or there be a slight leak around the edges cushioning can still take place. This modification is shown in Fig. 5, the inner pneumatic cushion being indicated at B'.

Although the pneumatic cushion is shown in the drawings encircling the axle, in some cases it may be sufficient to provide the upper half only.

I declare that what I claim is—

1. The combination with the frame and a wheel and axle of a bicycle, of a cushioning device interposed between said axle and frame, consisting of a ring cushion surrounding the axle and supported externally in the frame, and a swinging support pivoted to the frame and having the axle journaled thereon, so as to guide the axle while allowing it to move vertically under the influence of the cushion.

2. The combination with the frame and a wheel and axle of a bicycle, of a cushioning device interposed between said axle and frame, consisting of a pneumatic ring cushion surrounding the axle and supported externally in the frame, and plates pivotally supported on the frame and having the axle journaled therein, so as to guide the axle while allowing it to move vertically under the influence of the cushion.

3. The combination with the frame and driving-wheel axle of a bicycle, of a ring cushion surrounding said driving-wheel axle, and a thrust-rod pivoted to the frame and having the driving-wheel axle journaled therein, so as to guide the same while allowing its vertical movement.

In testimony whereof I have signed my name to this specification in the presence of two subscribing witnesses.

JOHN RICHARD HEATH.

Witnesses:
G. C. DYMOND,
W. H. BEESTON.